Aug. 2, 1966  J. C. BYSTRICKY ETAL  3,263,609
PUMP

Filed Sept. 19, 1963  2 Sheets-Sheet 1

INVENTORS
Joseph C. Bystricky
Jose L. Luna.

By A. L. Dumas.
Attorney

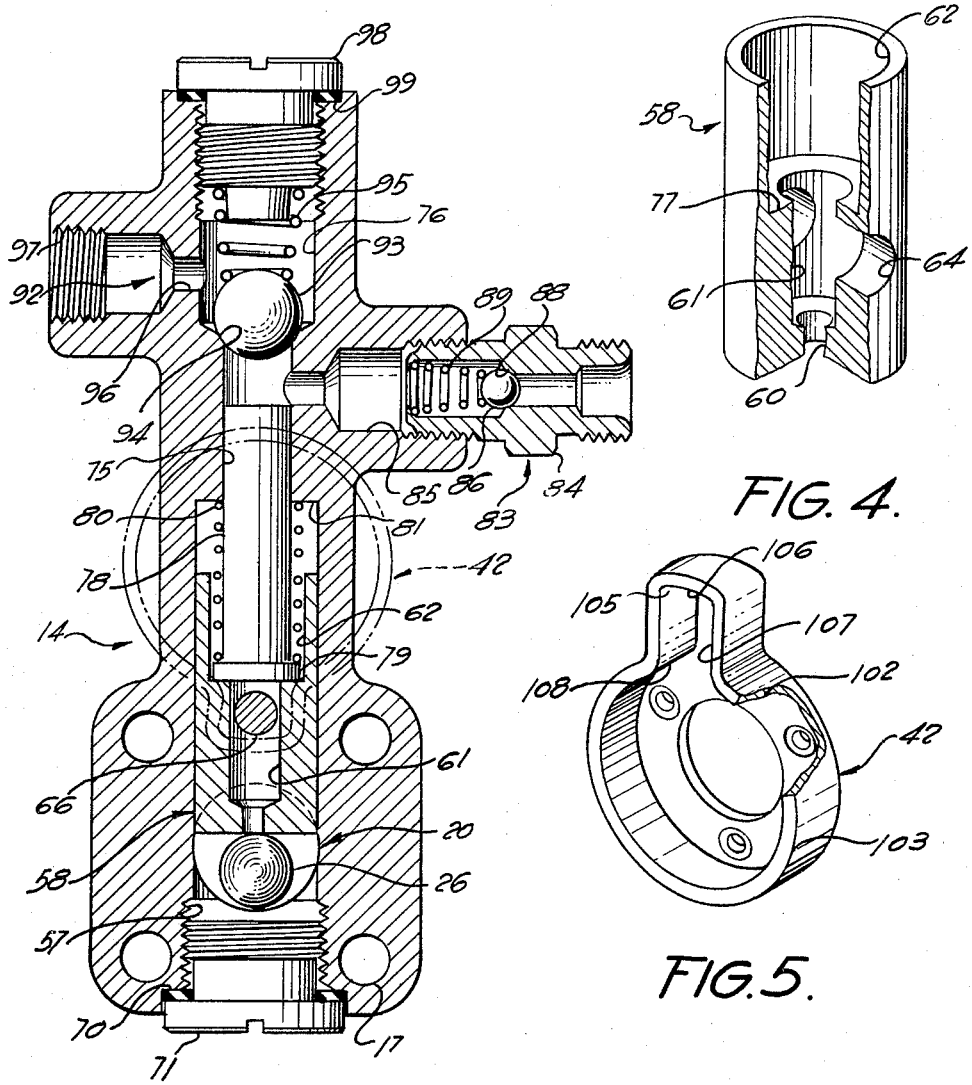

3,263,609
PUMP

Joseph C. Bystricky, Crystal Lake, and Jose L. Luna, Chicago, Ill., assignors to Stewart-Warner Corporation, Chicago, Ill., a corporation of Virginia
Filed Sept. 19, 1963, Ser. No. 309,999
11 Claims. (Cl. 103—23)

This invention relates to a pump, and more particularly, to a pump of the type that operates only periodically upon continuous operation of the drive to the pump, and only at a determinable percentage of the operating time of the pump drive.

In many industrial applications, such as in lubricating a bearing of a machine, a limited charge of lubricating fluid should be delivered to the bearing periodically dependent on the operation of the machine. A fluid pump commonly is used to force a supply of lubricant to the bearing, and intermittently operable valves or the like control both the time and quantity discharge of the lubricant as needed. However, such systems commonly require that the pump is operating continuously or that the fluid is confined under a pressure charge at all times. This needlessly and wastefully consumes energy and causes wear to the operating parts of the system.

Accordingly, an object of this invention is to provide a pump of the type that although having an input driven continuously, operates only periodically to pump the fluid under pressure therefrom.

Another object of this invention is to provide a pump that is economical to fabricate and operate, and is dependable in operation.

In order that these and other objects of this invention can be more fully appreciated, reference is made to the accompanying drawings, wherein:

FIG. 3 is an enlarged section view of the subject pump as seen generally from line 3—3 of FIG. 2;

FIG. 4 is a perspective view, partly broken away and in section, of a follower member used in the subject pump; and FIG. 5 is a perspective view of the cam member used in the subject pump.

Figure 2:
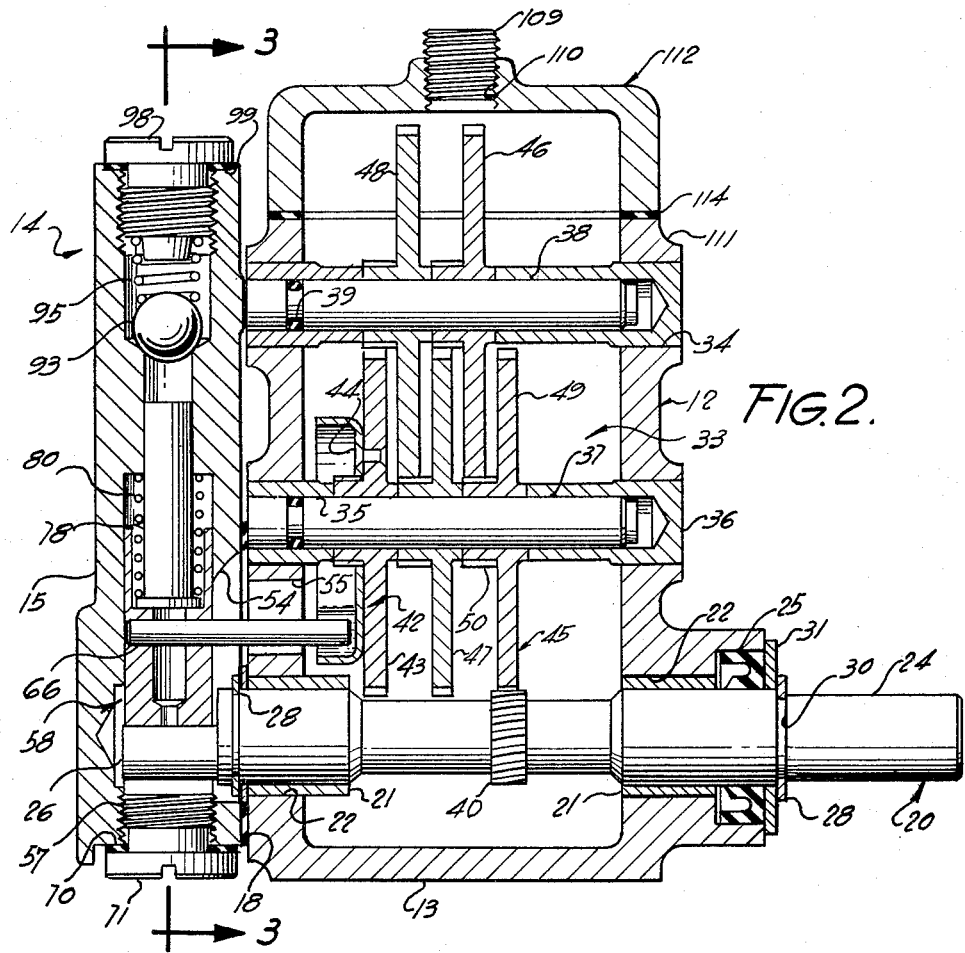
FIG. 2 is a sectional view as seen generally from line 2—2 of FIG. 1.
Figure 1:
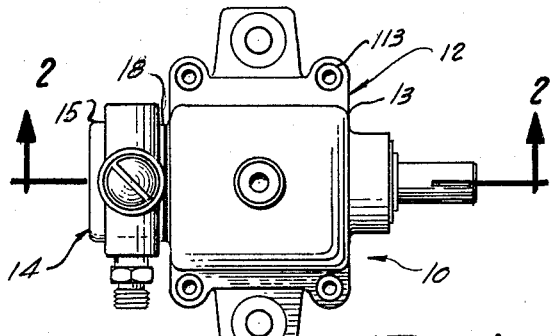
FIG. 1 is an elevational view of a preferred embodiment of the subject invention.

The unit 10, illustrated by the accompanying drawings, is a preferred embodiment of the subject invention showing a positive displacement pump adapted to be driven periodically responsive to continuous operation of its input shaft. The unit 10 consists of a drive unit 12 having a housing 13 and a pump unit 14 housed in turn in a pump housing 15. The housings 13 and 15 are secured together by means of bolts 17, with gasket 18 being disposed between the abutting housings to prevent fluid leakage from them.

The drive unit 12 includes a drive shaft 20 supported within journal bearings 21, which in turn, are received within aligned openings 22 in the housing 13. The end 24 of the drive shaft 20 projects from the housing 13 adapted to be connected to some external driving source (not shown). The end 26 of the shaft extends from housing 13 into pump housing 15 adapted to drive the pump unit 14 as will be more fully explained hereinafter. Seal 25 surrounds the shaft 20 adjacent the projected end 24 to prevent leakage from the housing 13. The shaft 20 is held in place relative to the housing 13 by means of snap rings 28 received in grooves 30 in the shaft and adapted to bear against washers or thrust elements 31 confined against the opposite sides of the housing 13.

The housing 13 supports therein a gear train 33 from the shaft 20 to a cam member 42 to be discussed hereinafter. Aligned openings 34 in the housing 13 receive in press-fit relationship hub members 35 and 36, which in turn support gear train shafts 37 and 38. Seals 39 on the shafts 37 and 38 between each shaft and the hub 35 close off leakage past the hub and shaft. A drive pinion 40 is keyed to the drive shaft 20, and the cam member 42 is rotatably supported by gear member 43 on shaft 37. The cam member 42 is keyed by rivet 44 to rotate as a unit with the gear member 43. The gear train 33 is formed by separate gear members 45, 46, 47 and 48 each having a large gear as at 49 and a small pinion as at 50 on gear member 45, and the previously mentioned gear 43. The gear members 43, 45 and 47 are supported rotatably on the shaft 37 while the gears 46 and 48 are supported rotatably on shaft 38. The mechanical interaction through the gear train 33 thus drives the cam member 42 at a given speed ratio of that of the drive shaft 20, which in this case is shown as a greatly reduced ratio.

Referring to FIG. 2 the side of the pump housing 15 has an opening 54 therein which communicates generally with the interior of the drive unit housing 13 through an aligned slot 55 in the housing 13. The end 26 of the drive shaft 20 projects through this opening 54 into an elongated cylindrical bore 57 in the pump housing 15. A follower 58 (FIG. 4) is positioned to reciprocate within the bore 57. The follower 58 is a generally cylindrical member having axial opening 60, and enlarged bores 61 and 62 concentric therewith. The follower member 58 also has a transverse bore 64 which intersects the bore 61 near the transition thereof with the bore 62. A pin member 66 is adapted to be received in a slip fit within the transverse bore 64 and to extend through the aligned opening 54 and slot 56 to adjacent the cam member 42. The follower 58 and pin 66 are free to reciprocate as a unit within the bore 57, with the pin 66 reciprocating in the slot 55 preventing rotation of the follower 58 within the bore 57. The bore 57 is closed and sealed by means of a gasket 70 trapped by headed plug 71 threaded into the end of the bore.

The pumping housing 15 further has a concentric bore 75 communicating with bore 57 and extended to an enlarged bore or chamber 76 at the opposite end of the pump housing. A piston member 78 is received within the bore 75 adapted to reciprocate axially therein. The opposite end of the piston 78 being headed as at 79, fits freely within the bore 62 of the follower but abuts with the annular ledge 77 between the bores 61 and 62. A spring 80 confined between the headed portion 79 of the piston and shoulder 81 on the housing tends to bias the poston 78 against the follower 58 which in turn is biased against the end 26 of the drive shaft 20. In the position as shown in FIG. 3 the pin 66 is received within a tail or keyhole portion of cam member 42 which will be discussed more fully hereinafter.

The fluid inlet to the pump is formed generally at 83 and includes a hollow fitting 84 threaded into an appropriate transverse bore 85 which communicate generally with the piston bore 75. The fitting 84 includes therein a ball check 86 maintained against a seat 88 by means of spring member 89. A fluid outlet 92 is formed from the chamber 76 of the housing 15 and includes a ball check 93 biased against seat 94 by means of spring 95. The housing chamber 76 communicates through passage 96 with a threaded outlet opening 97 adapted to form communication with an outlet pipe or the like (not shown). A headed plug 98 threaded into the housing 15 closes by means of an interposed seal 99 the otherwise open end of bore 76.

As can be seen in FIG. 3 the end 26 of the shaft is a cylindrical contour offset by a given eccentricity from the longitudinal center axis of the drive shaft 20. It can be appreciated that rotation of the drive shaft 20 causes the eccentric end 26 to move within the housing 15 axially of the bore 57. The piston 78 and follower 58 being spring biased against the eccentric 26, are thus caused to oscillate within the respective bores 75 and 57. The piston 78 upon a stroke away from the eccentric 26 causes the slug of fluid confined in the bore ahead of it to be discharged from the fluid outlet 92 past the ball check 93 to the outlet opening 97. The full stroke of the piston 78 will be equal to twice the offset of the eccentric 26 from the center axis of the shaft 20, and the frequency of pumping stroke will correspond to the frequency of revolution of the shaft. With no interference in the action of the follower 58 or piston 78 the pumping is continuous upon rotation of the input shaft 20, the piston being driven by the eccentric 26 on the pumping stroke and being biased by spring 80 on the return or priming stroke.

Referring now to the cooperation of the cam member 42 and pin 66, it will be noted that the cam member is generally cup-shaped toward the projected pin 66 having a peripheral side wall 102 that surrounds the pin. The contour of the side wall 102 is generally circular as at 103 concentric of the rotatable axis of its shaft 37 and is generally flared out in the form of a tail or keyhole as at 105 from the circular contour 103. The tail or keyhole contour 105, as can be seen in FIG. 2, has a circumferential surface 106 at a greater radial distance from the supporting shaft 37 than the pin 66 is when the follower 58 abuts the eccentric 26 and the eccentric is in its further top dead center position. Under such circumstances, the pump operates through a full pumping and priming stroke simultaneously with the rotation of the drive shaft 20.

However, since the cam member 32 is connected through the gear train 33 to the drive shaft 20, it will also rotate about the shaft 37 to cause the tail portion 105 to move out of alignment with the bore 57 and to bring in its place the circular contour 103 of the cam member. Under such circumstances, the pin 66 is no longer able to complete a return stroke through the action of the spring 80 to cause the follower 58 to follow the eccentric 26, but instead holds the follower from the eccentric for at least a portion of a revolution of shaft 20. In the embodiment shown, the circular contour 103 of the cam member 42 is close enough radially to the shaft 37 to confine the pin 66 and prevent the follower 58 from abutting the eccentric 26 at all during a revolution of the shaft 20.

When the pin 66 is confined by abutment with the circular contour 103 of the cam, even upon rotation of the shaft 20 and eccentric 26 the pump piston 78 is stationary within the bore 75. The cam member 42, however, rotates at the fixed ratio determined by the gear train 33 to cause the pin 66 to slide along the contour 103. After the designated number of revolutions of the drive shaft 20 the tail portion 105 of the cam will again align with the slot 55 so as to permit the pin 66 to be biased by the spring 80 the full return stroke to maintain the follower 58 against the eccentric 26.

It will be noted that the generally radial surfaces 107 on the side wall 102, although transition surfaces, are not in effect actual cam surfaces since they act not to move the pin 66 toward the shaft 37 but merely hold the pin against returning the full stroke back toward the eccentric. This is apparent since the eccentric will always cause the pin 66 to move at least to its furthest position away from the center axis of the shaft 20 when the eccentric is at the nearer top dead center position. Similarly, the circular contour 103 merely prevents the pin from returning under the force of the spring 80 to the position where the follower 58 follows the eccentric 26. A true cam surface 108 can be provided between the contours 103 and 107 which would have a cam action on the pin 66 to overcome the force of spring 80 upon withdrawing the follower 58 completely from the eccentric 26.

It will be understood that in operation the drive unit housing 13 should contain a quantity of lubricating fluid so as to lubricate and cool the gears and bearings as required. The lubricating fluid can be communicated through the slot 55 and opening 54 in the housings to within the bore 57 occupied by the follower 58. This will lubricate also the follower within the bore 57 and the eccentric 26 against the follower 58. Also the opening 60 and bores 61 and 62 communicate to the piston 78 to provide for a lubrication of the piston within the bore 75. On the other hand, this open circuit provides for a ready bypass of any fluid leakage past the mating piston 78 and bore 75 to the housing 15 to eliminate choking of the follower within the bore 57.

To provide for filling or changing of the oil within the drive unit housing 13 a removable plug 109 is threaded into a threaded opening 110 in the housing wall. Also to permit assembly of the gear train as required the housing 13 is separable having a main portion 111 and a cap 112 secured thereto by bolts 113. A seal 114 interposed between the separate portions 111 and 112 maintains the housing fluid-tight.

It will be appreciated that variations of the piston stroke of the pump unit 14 are possible through the action of the cam member 42 and pin 66, by reshaping the cam contour 102. For example, it is possible by changing the number of tail contours to provide two or three full stroke cycles per revolution of the cam member 42. Also, by providing a circumferential contour at some radial distance between the full pumping contour 106 and the no pumping contour 103, a part stroke piston cycle control is possible. The ratio of pump time to actual shaft operating time of the unit can be modified as desired by merely proportioning the ratio of drive between the input shaft 20 and the cam member 42.

Thus, while only a single embodiment has been disclosed many modifications can be made therein without departing from the inventive content of this disclosure. Accordingly, it is desired that the invention be limited only by the scope of the claims hereinafter following.

What is claimed is:

1. A pump, comprising a housing, an input shaft supported to rotate within the housing, a pumping member movable to define an expansible pumping chamber, fluid inlet and outlet means for the pumping chamber, actuating means driven by the input shaft operable to actuate the pumping member in one direction only for altering the volume of said pumping chamber to cause fluid flow through said chamber, means for driving said pumping means in the opposite direction only to hold said pumping means engaged with said actuating means, and retaining means driven by the input shaft at a different ratio than that of the actuating member operable intermittently to hold the pumping member spaced and free from the actuating member against the force of said driving means so as to prevent fluid flow through said chamber.

2. A pump, comprising a housing, a shaft supported to rotate within the housing, a pumping member movable within the housing to define an expansible pumping chamber, inlet and outlet means for the pumping chamber, actuating means driven by the shaft operable to actuate the pumping member in one direction only upon operation of the shaft, biasing means for driving said pumping member in the opposite direction only to hold said pumping member engaged with said actuating means, a retainer member operable in certain positions to hold the pumping member spaced and free from the actuating means against the force of said biasing means effective thereby to prevent full pumping from the pump and in certain other positions to have no effect on the pumping member to permit said biasing means to force said pumping member in the opposite direction for engaging said actuating means, and drive means between the shaft and the retainer member operable to drive the latter at a different ratio than that of the actuating means for periodically holding said pumping member spaced from said actuating means to prevent actuation of said pumping member by said actuating means.

3. A pump, comprising a housing, a shaft supported by the housing, a pump including a pump piston adapted to reciprocate within a pump bore to define an expansible pumping chamber, fluid inlet and outlet means for the pumping chamber, means forming a separable connection between the shaft and the pump piston operable when connected and upon rotation of the shaft to reciprocate the piston a full pumping stroke relative to the pumping chamber, means to return the pump piston for a priming stroke for the pumping chamber, retainer means rotatably supported by the housing adapted in certain positions relative thereto to hold the pump piston in a manner to separate the connection between the shaft and the pump piston for at least a portion of the rotation of the shaft, and in certain other positions to permit otherwise continuous connection between the shaft and the piston, effective thereby to vary the stroke of the piston to something less than the full pumping stroke, and drive means connected between the shaft and the retainer means operable to drive the retainer means to said first-mentioned certain positions periodically upon operation of the shaft so as to cause intermittent pumping operation from the pumping chamber even upon continuous operation of the shaft.

4. A pump, comprising a housing, a shaft supported by the housing, said housing having a pump bore, a pump piston adapted to reciprocate within the pump bore to define a pumping chamber, fluid inlet and outlet means for the pumping chamber, an eccentric secured to the shaft, means forming a drive connection between the eccentric and the pump piston, said drive connection being operable when connected and upon rotation of the shaft to reciprocate the piston a full stroke relative to the pumping chamber, spring means tending to maintain the drive connection connected, retainer means rotatably supported by the housing, said retainer means being operable in certain rotatable positions to hold the pump piston in a manner to separate the drive connection between the eccentric and the pump piston and in certain other positions to permit otherwise continuous connection between the eccentric and the piston, effective thereby to vary the stroke of the piston to something else than said full stroke, and drive means connected between the shaft and the retainer means operable to drive the latter at a different speed ratio than the shaft so as to cause intermittent full stroke pumping from the pumping chamber.

5. A pump, comprising a housing, a shaft supported by the housing, an eccentric fixed to the shaft, the housing having a pump bore, a pump piston adapted to reciprocate within the pump bore to define an expansible fluid chamber, inlet and outlet means communicatable with the pumping chamber, said piston having a headed end extending from the pump bore, a spring confined between one side of the headed end of the piston and the housing adapted to bias the piston in the direction toward the eccentric, a follower member interpose between the opposite side of the headed portion of the pump piston and the eccentric adapted to resist the spring bias of the piston toward the eccentric, said eccentric being operable upon rotation of the shaft to move the follower member so as to drive in turn the pump piston against the bias of the spring to affect the full stroke of the piston, a pin member carried by the follower member, a cam member supported rotatably by the housing, said cam member being operable in certain rotatable positions to permit free movement of the pin member, follower member, and pump piston within the limits of the stroke of the piston and being operable in certain other positions to abut the pin member so as to limit thereby the movement of the follower member and pump piston toward the eccentric to shorten the stroke of the piston, and mechanical drive means between the shaft and the cam member operable to drive the latter at a predetermined nonunitary ratio relative to the former.

6. A pump, comprising housing means, a shaft rotatably supported by the housing means, said housing means defining a pump bore, a piston adapted to reciprocate within the pump bore to define an expansible pumping chamber, fluid inlet and outlet means communicatable with the pumping chamber, a spring between the piston and housing means operable to bias the piston toward the position thereof corresponding to the maximum volume of the pumping chamber, an eccentric mechanically driven by the shaft, a follower member between the eccentric and the pump piston adapted to restrict movement of the pump piston in the direction toward said maximum volume position, said eccentric being adapted to drive the follower member and thus the piston a pumping stroke of the piston from the maximum volume position to a second position corresponding to the minimum volume of the pumping chamber, a retainer cam member rotatably supported by the housing and positioned generally adjacent the follower member, said cam member being adapted in certain of its rotatable positions to restrict movement of the follower member and thus the pump piston to the maximum volume position of the pump piston and being adapted in all other rotatable positions to permit free unrestricted movement of the follower member and the pump piston, and drive means between the shaft and the cam member operable to drive the latter to the various rotatable positions at a different speed ratio than that of the eccentric to cause only periodic full stroke pumping upon rotation of the shaft.

7. A pump, comprising a housing, a shaft rotatably supported by the housing, a pumping unit supported by the housing, said pumping unit including a pump bore and a piston adapted to reciprocate within the pump bore to define an expansible pumping chamber, and inlet and outlet means for the pumping chamber, a spring between the piston and housing operable to bias the piston to a position thereof corresponding to the maximum volume of the pumping chamber, a follower abutting the pump piston adapted to restrict movement of the pump piston in the direction toward said maximum volume position, an eccentric connected to the input shaft, said eccentric being adapted to abut the follower to drive it and the piston from the maximum volume position to a second position of the piston corresponding to the minimum volume of the pumping chamber, a cam member rotatably supported by the housing generally adjacent the follower member, said cam member being adapted in certain of its rotatable positions to restrict movement of the follower member and thus the pump piston to the maximum volume position and being adapted in other rotatable positions to permit unrestricted movement of the follower member and the pump piston to the maximum volume position, and drive means between the shaft and the cam member operable to drive the latter at some nonunitary ratio relative to the former, so that even upon continuous rotation of the shaft the pump piston will pump at maximum stroke only intermittently depending in part on the ratio of drive between the shaft and the cam member.

8. A pump, comprising a housing, a shaft supported rotatably by the housing, an eccentric fixed to the shaft, a pump piston adapted to reciprocate within the housing in a direction toward and away from the eccentric to define an expansible fluid chamber, inlet and outlet means communicatable with the pumping chamber, a spring confined between one side of the pump piston and the housing adapted to bias the piston in the direction toward the eccentric, said eccentric being operable to limit movement of the piston in the direction toward the eccentric, so that rotation of the shaft thus causes through the eccentric and the biasing spring the piston to reciprocate a full stroke within the housing, a cam member supported by the housing adjacent the piston and adapted to rotate on an axis generally transverse to the direction of movement of said piston, said cam member being operable in certain positions to permit the full stroke of the piston and being operable in certain other positions to limit the movement of the piston toward the eccentric effective thereby to shorten or eliminate entirely the stroke of the piston, and mechanical drive means between the shaft and the cam member operable to drive the latter at a fractional nonunitary ratio relative to the former.

9. A pump, comprising a housing, a shaft supported rotatably by the housing, an eccentric fixed to the shaft, a pump piston adapted to reciprocate within the housing in a direction generally toward the eccentric to define an expansible fluid chamber, inlet and outlet means communicatable with the pumping chamber, resilient means to bias the piston in the direction toward the eccentric, a follower member interposed between and adapted to abut the pump piston and the eccentric and being movable in the same general direction as the pump piston operable to resist the spring bias of the piston toward the eccentric, the rotation of the shaft thus causing through the follower member abutting the eccentric and being moved thereby the pump piston to reciprocate within the housing, a cam member supported by the housing adjacent the follower member and adapted to rotate on an axis generally transverse to the direction of movement of said follower member, said cam member being operable in certain positions to permit free movement of the follower member and being operable in certain other positions to restrict the follower member in its movement toward the eccentric effective to separate the follower member from the eccentric, and mechanical drive means between the shaft and the cam member operable to drive the latter at a fractional nonunitary ratio relative to the former.

10. A pump, comprising a housing, a shaft supported rotatably by the housing, an eccentric fixed to the shaft, a pump piston adapted to reciprocate within the housing to define an expansible fluid chamber, inlet and outlet means communicatable with the pumping chamber, a spring confined between one side of the pump piston and the housing adapted to bias the piston in the direction toward the eccentric, a follower member interposed between and adapted to abut the opposite side of the pump piston and the eccentric, said follower member being movable in the same general direction as the pump piston and being operable to resist the spring bias of the piston toward the eccentric, the rotation of the shaft thus causing through the follower member abutting the eccentric and being moved thereby the pump piston to reciprocate within the housing, a pin member carried by the follower member and projecting transverse to its direction of movement, a cam member supported by the housing adjacent the pin member and adapted to rotate on an axis generally parallel to said pin member, said cam member being cup-shaped around the end of the pin member and operable in certain positions to permit free movement of the pin member and being operable in certain other positions to abut the pin member so as to limit thereby the movement of the follower member toward the eccentric effective to separate the follower member from the eccentric, and mechanical drive means between the shaft and the cam member operable to drive the latter at a predetermined nonunitary ratio relative to the former.

11. A pump, comprising a housing, a shaft supported rotatably by the housing, an eccentric fixed to the shaft, a pump piston adapted to reciprocate within the housing in a direction toward and away from the eccentric to define an expansible fluid chamber, inlet and outlet means communicatable with the pumping chamber, a spring confined between one side of the pump piston and the housing adapted to bias the piston in the direction toward the eccentric, a follower member interposed between and adapted to abut the opposite side of the pump piston and the eccentric, said follower member being movable within the housing in the same general direction as the pump piston and being operable to resist the spring bias of the piston toward the eccentric, the rotation of the shaft thus causing through the follower member abutting the eccentric and being moved thereby the pump piston to reciprocate within the housing, a pin member carried by the follower member and projecting transverse to its direction of movement, a cam member supported by the housing adjacent the pin member and adapted to rotate on an axis generally parallel to said pin member, said cam member being cup-shaped and having a side wall disposed around the end of the pin member and shaped to a predetermined contour, the cam member thereby being operable in certain positions to permit free movement of the pin member relative to the contour and being operable in certain other positions to cause the side wall at that portion of the contour to abut the pin member so as to limit thereby the movement of the follower member toward the eccentric effective to separate the follower member from the eccentric, and mechanical drive means between the shaft and the cam member operable to drive the latter at a fractional nonunitary ratio relative to the former.

References Cited by the Examiner

UNITED STATES PATENTS

| 2,245,860 | 6/1941 | Hunting | 184—27 |
| 2,389,475 | 11/1945 | Watson | 103—23 |
| 2,468,002 | 4/1949 | Teal | 103—213 |

FOREIGN PATENTS

| 704,457 | 3/1941 | Germany. |

LAURENCE V. EFNER, *Primary Examiner.*